United States Patent [19]

Rapp

[11] Patent Number: 4,817,279

[45] Date of Patent: Apr. 4, 1989

[54] METHOD AND APPARATUS FOR SELECTIVELY FEEDING STRIPS OF MATERIAL

[75] Inventor: Willard E. Rapp, Princeton, N.J.

[73] Assignee: American Telephone and Telegraph Company, New York, N.Y.

[21] Appl. No.: 168,632

[22] Filed: Feb. 29, 1988

Related U.S. Application Data

[63] Continuation-in-part of Ser. No. 37,487, Apr. 13, 1987, abandoned.

[51] Int. Cl.[4] .......................... H01R 9/09; B23P 23/00

[52] U.S. Cl. ...................................... 29/845; 29/564.6; 29/566.2; 29/741; 29/747

[58] Field of Search .............. 29/741, 747, 845, 564.6, 29/566.2, 566.3

[56] References Cited

U.S. PATENT DOCUMENTS

| | | | |
|---|---|---|---|
| 3,057,528 | 10/1962 | Cole et al. | 226/37 |
| 3,276,706 | 10/1966 | House | 242/55.3 |
| 3,550,829 | 12/1970 | Miyauchi | 226/110 |
| 3,597,824 | 8/1971 | Yoshida | 29/203 |
| 4,138,834 | 2/1979 | Nobuhiro | 53/212 |
| 4,174,567 | 11/1979 | Kamoshida | 29/741 |
| 4,313,251 | 2/1982 | Asai | 29/564.6 |
| 4,417,396 | 11/1983 | Ammon et al. | 29/884 |
| 4,519,132 | 5/1985 | Kleinedler et al. | 29/845 |
| 4,598,471 | 7/1986 | Elsbree, Jr. et al. | 29/747 X |
| 4,610,408 | 9/1986 | Box et al. | 47/16 |
| 4,612,700 | 9/1986 | Loomis et al. | 29/741 X |

*Primary Examiner*—Carl J. Arbes
*Attorney, Agent, or Firm*—Robert B. Levy

[57] ABSTRACT

A first one of a plurality of continuous pin strips (24) is selectively fed into an input slot (40) of a machine (38) by first guiding each pin strip into one end (65*a*) of a separate one of a plurality of spaced channels (64) extending across a plate (46). The plate is selectively indexed by means of a servo-actuator (71) to position the other end (65*b*) of a first one of the channels containing the first strip in alignment with the input slot on the machine. The first of the pin strips within the first channel is advanced through the first channel and into the input slot.

14 Claims, 7 Drawing Sheets

FIG. 1
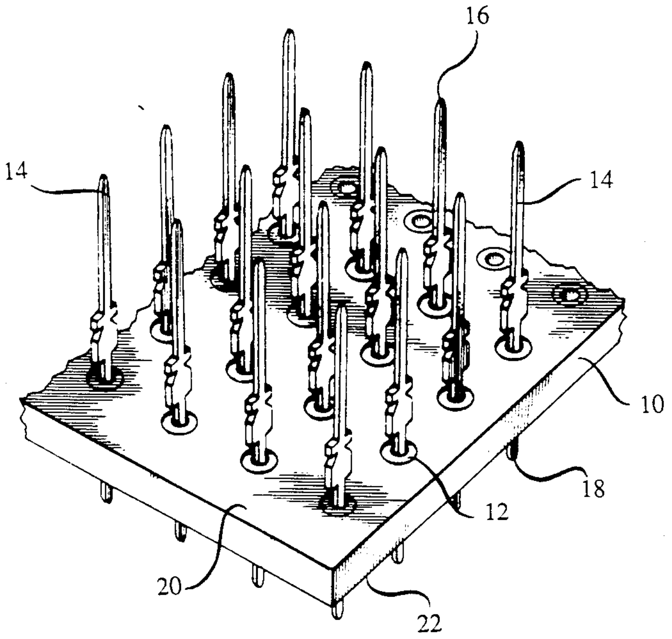
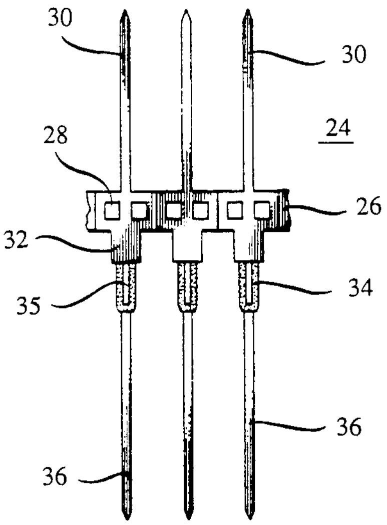
FIG. 2
(PRIOR ART)

METHOD AND APPARATUS FOR SELECTIVELY FEEDING STRIPS OF MATERIAL

This application is a continuation-in-part of application Ser. No. 037,487, filed Apr. 13, 1987, now abandoned.

TECHNICAL FIELD

This invention relates in general to a method and apparatus for selecting and feeding one of a plurality of strips of material into an input slot on a machine, and more particularly, to such a method wherein pins are sheared from a selected one of a plurality of continuous strips of pins.

BACKGROUND ART

Many manufacturing operations involve processing a strip of material. One example is the process of inserting conductive pins into apertures in a planar substrate known as a backplane which is commonly used in electronic equipment for interconnecting two or more printed circuit boards. In practice, the pins are first severed from a pin strip comprised of a plurality of pin members each integral with a continuous spine. The individual pins sheared from the strip are then inserted into the apertures in the backplane. Various machines currently exist for shearing one or more pins from a continuous pin strip while others serve to insert the sheared pins into corresponding apertures in the backplane. In copending U.S. patent application Ser. No. 878,903, filed June 6, 1986, in the names of N. R. Basavanhally et al. and assigned to the instant assignee (herein incorporated by reference), there is described a machine which automatically accomplishes both tasks. For a more detailed description of the Basavanhally et al. machine, reference should be had to the above-mentioned co-pending application.

Unfortunately, the Basavanhally et al. machine is only capable of receiving a single pin strip at its input slot. Often it is desirable to insert pins of different height in the same backplane, which requires that separate pin strips, each containing pins of the desired height, be fed sequentially into the input slot of the Basavanhally et al. machine. To change pin strips, each pin strip, after being fed into the input slot on the Basavanhally et al. machine, must be manually removed and replaced with a new one containing pins of a different size. Such manual changeover of pin strips is time consuming and causes production delays.

BRIEF SUMMARY OF THE INVENTION

The present invention is directed to a method for selectively feeding varying lengths of one or more of a plurality of strips of material into an input slot of a machine. First, each of a plurality of strips of material is fed into one end of a separate one of a plurality of spaced channels extending across a plate. Next, the plate is indexed to selectively position the other end of a first channel in alignment with the input slot of the machine. Once the first end of the first channel is positioned in alignment with the input slot, a length of the strip in the first slot is advanced into the slot. The length of the strip which is advanced may be varied to control the length of the strip which enters the input slot on the machine. To feed a second strip, the first strip within the first channel is withdrawn from the input slot. Next, the plate is indexed to align the other end of a second one of the channels with the input slot on the machine. Thereafter, a length of the second strip is advanced into the input slot. As with the first strip, the length of the second strip advanced into the slot may be varied.

In practice, the channels diverge or fan out as they run within the plate away from the input slot on the machine. Thus, the ends of the channels which are adjacent to the input slot of the machine are spaced closer together than the opposite ends of the channels. In this way, sufficient room is provided on the plate so that a mechanism for feeding each strip into and out of each channel may be located at the end of each channel distant from the input slot without the need to make the plate excessively large. An additional advantage achieved by fanning out the channels is that the amount of movement required to index the plate to bring the end of each channel closest to the input slot into alignment therewith is minimized.

Each of the strips which is selectively fed into the input slot of the machine is typically first unwound from a roll so that the major plane of the strip is in a horizontal orientation. Prior to being guided into each channel, each strip is twisted 90° so that the major plane thereof is vertical. Typically, each strip is twisted only after the strip has passed over the plate to prevent the strip from tangling as it is unwound from the roll.

BRIEF DESCRIPTION OF THE DRAWINGS

FIG. 1 is a perspective view of a portion of a prior art backplane;

FIG. 2 is a frontal view of a portion of a continuous pin strip from which pins are sheared for insertion into the backplane of FIG. 1;

DETAILED DESCRIPTION

Figure 3:
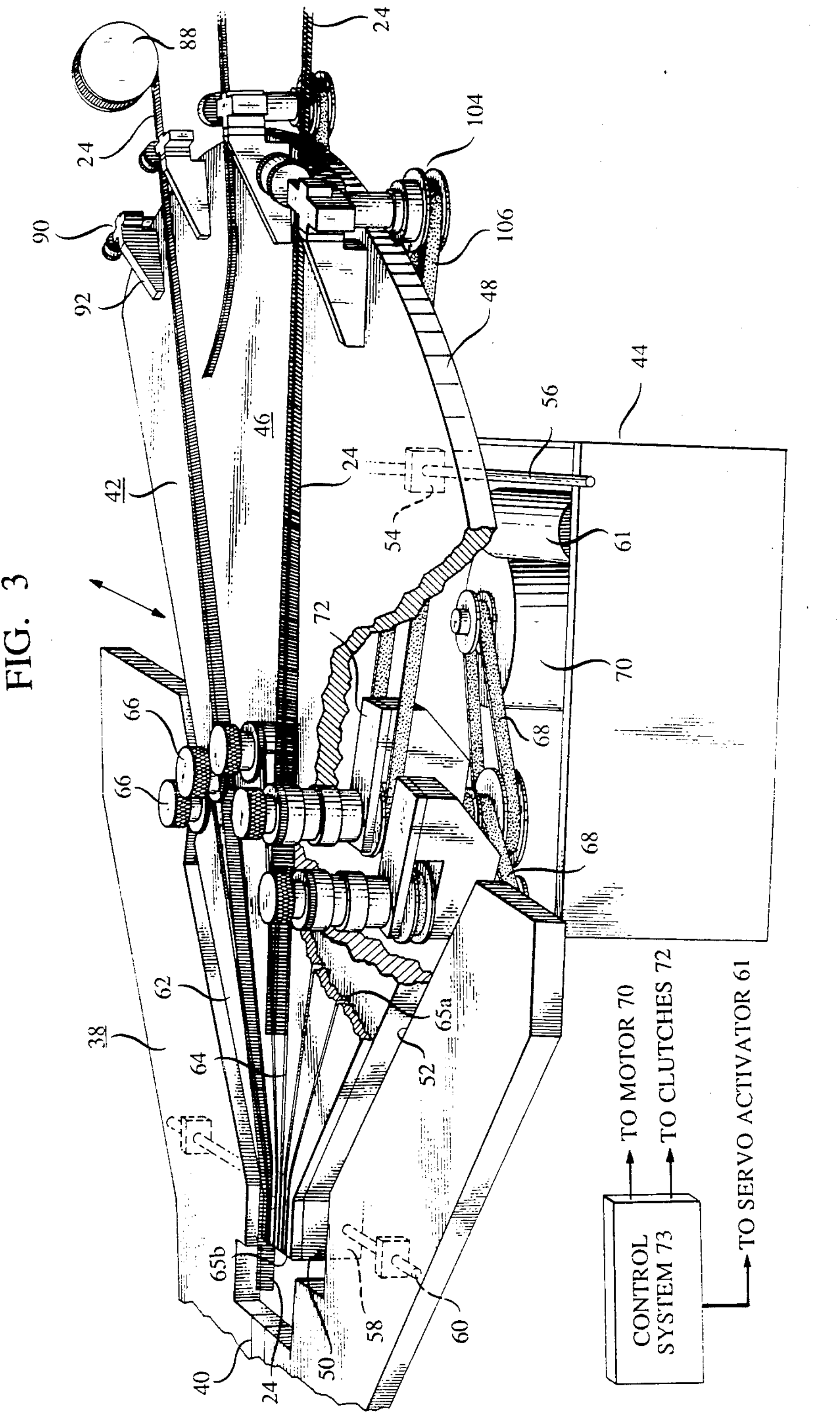
FIG. 3 is a perspective view of an apparatus for selectively feeding one of a plurality of continuous pin strips into an input slot of a machine.

FIG. 1 is a perspective view of a portion of a backplane 10 (e.g., an epoxy-resin substrate), which is provided with a plurality of spaced, metal-plated apertures 12 therethrough. Each aperture 12 is sized to receive a conductive metal pin 14 therein. Typically, each pin 14 is sized such that its ends 16 and 18 each extend beyond a separate one of a pair of major surfaces 20 and 22 on the backplane 10 once the pin has been inserted into the aperture 12. After the pins 14 have been inserted into the backplane 10, one or more additional operations may be performed on the backplane, such as, for example, soldering the pins in place.

In practice, the pins 14 are not fabricated as individual elements. Referring to FIG. 2, a continuous pin strip 24 is first formed from a metal, typically a nickel, copper and tin alloy, and then individual pins 14 (see FIG. 1) are sheared therefrom. The pin strip 24 comprises a continuous spine 26 having equally spaced perforations 28 therein. Each of a first plurality of spaced pin members 30 is integral with the spine 26 and extends upwardly therefrom (as shown in FIG. 2) so as to be equidistant between a pair of the perforations 28. Each of a plurality of spaced shoulders 32 is also integral with the spine 26 and extends therefrom in a direction opposite to, but in alignment with, a separate one of the first pin members 30.

Extending from each shoulder 32 is a solder-coated, hollowed-out, cylindrical element 34 having a slit 35 therein to allow the radial deformation thereof upon insertion into the aperture 12 of FIG. 1. A second pin member 36 extends from each cylindrical element 34 in a direction opposite to, but in axial alignment with, each first pin member 34. The first and second pin members 30 and 36 become the ends 16 and 18, respectively, of each pin 14 of FIG. 1 obtained by severing the spine 26 of the strip 24 at a pair of perforations 32.

FIG. 3 illustrates part of a machine 38, as described in the abovementioned Basavanhally et al. application, for shearing the pins 14 (see FIG. 1) from the pin strip 24 fed into an input slot 40 on the machine and inserting the sheared pins into the backplane 10 of FIG. 1. The machine 38 is designed to accommodate only one pin strip 24 at its input slot 40 at any given time. When a pin strip 24 yielding pins 14 (see FIG. 1) of a different height is to be fed into the input slot 40, the pin strip presently being fed into the input slot must be manually removed. Such a procedure is time consuming.

An apparatus 42 has been developed to selectively feed varying lengths of each of a plurality of pin strips 24 into the input slot 40 of the machine 38 in an automatic manner. The apparatus 42 comprises a pedestal 44 which supports a pie slice-shaped plate 46 thereon. The plate 46 has an arcuate edge 48 at its rearward (right-hand) end and a squared-off tip 50 at its forward (left-hand) end. The forward end of plate 46 overhangs the pedestal 44, thereby allowing the tip 50, and a portion of the plate rearward therefrom, to extend into a recess 52 on the machine 38 leading into the input slot 40. The recess 52 is sized to allow the portion of the plate 46 extending therein to move laterally relative to the input slot 40.

The control system 73 comprises a conventional motor control system, well known in the art, which allows both the speed and duty cycle of the motor 70 to be controlled. By controlling the duty cycle of the motor 70, that is, the duration of the interval during which the motor is actually running, as well as its speed, the length of the pin strip 24 advanced into the input slot 40 can be varied. In this way, different lengths of each of the pin strips 24 in each of the channels 64 can be fed into the input slot 40.

A first pillow block 54 depends from the undersurface of the plate 46 to slidably engage a shaft 56 having its ends mounted to the pedestal 44 so as to be perpendicular to the longitudinal axis of the input slot 40 on the machine 38. Another pillow block 58 is affixed to the undersurface of the plate 46 proximate the tip 50 for slidably engaging a shaft 60 secured to the machine 38 so as to extend across the recess 52 in a direction parallel to the shaft 56. A servo-actuator 61 is coupled between the plate 46 and the pedestal 44 for precisely displacing (indexing) the plate along the shafts 56 and 60 to move the tip 50 laterally with respect to the input slot 40.

A plurality of channel members 62 are mounted to the top of the plate 46 so as to run rearwardly (rightwardly) from the tip 50 a distance equal to approximately one third of the length of the plate. The channel members 62 are spaced apart, creating each of a plurality of channels 64 therebetween. Each channel 64 is wide enough to accommodate the thickness of a pin strip 24 when the strip is fed, with its major plane in a vertical orientation, into a first opening (mouth) 65*a* of the channel. At the end of each channel 64 opposite the mouth 65 is an opening 65*b* which is opposite the input slot 40.

In practice, the channel members 62 are shaped such that each of the channels 64 created therebetween runs rearwardly from the opening 65*b* parallel to the other channels for a short distance before diverging. Thus, the channels 64 fan out as they run within the plate 46 away from the input slot 40. By having the channels 64 fan out as described, the ends 65*b* thereof will be spaced closer together than the ends 65*a*. Thus, the amount of indexing of the plate 46 required to align the end 65*b* of a selected one of the channels 64 with the input slot 40 is reduced as compared to the amount of indexing which would be required if the channels were uniformly spaced apart.

A plurality of feeder rollers 66 are vertically journaled into the plate 46 so that each feed roller is adjacent to the end 65*a* of a separate one of the channels 64 for engaging the pin strip 24 fed therein. Because the channels 64 fan out, each of the feed rollers 66 can be advantageously located adjacent to the end 65*a* of each channel without the need to make the plate 46 excessively large as would otherwise be required if the channels were uniformly spaced apart. Each feed roller 66 is selectively driven, via one or more drive belts 68, from a variable speed motor 70 through a separate one of a plurality of electrically operated clutches 72. The motor 70, the clutches 72 and the servo-actuator 61 are controlled by a control system 73 which may be operated either in synchronism with, or independently of, the control system (not shown) for the machine 38.

The operation of the apparatus 42 may be understood by reference to FIG. 3. At the outset of operation, a sufficient length of the pin strip 24 is fed into the mouth 65*a* of a separate one of the channels 64. When a first pin strip 24 is to be fed into the input slot 40 on the machine 38, the servo-actuator 61 is energized by the control system 73 to index the plate 46 to align the end 65*b* of a first one of the channels 64 carrying the first pin strip with the input slot. Thereafter, the first pin strip 24, which is located within the first channel 64, whose end 65*b* is now aligned with the input slot 40, is then advanced towards the input slot. This is accomplished by actuating the corresponding one of the clutches 72 to drive the corresponding feed roller 66.

In order to feed a second pin strip 24 into the input slot 40, the pin strip currently being fed therein is withdrawn therefrom. This is accomplished by actuating the corresponding clutch 72 to drive the corresponding feed roller 66 in the opposite direction as before. Thereafter, the plate 46 is again indexed to align the end 65*b* of a second one of the channels 64 carrying the second pin strip 24 with the input slot 40. Once the end 65*b* of the second channel 64 has been aligned with the input slot 40, the second pin strip 24 within the second channel is advanced into the input slot. In practice, the selective feeding of the first and second pin strips 24 is accomplished automatically. In response to data received indicative of the sequence of the pin strips 24 to be fed into the feed slot, the control system 73 sequentially activates the corresponding one of the clutches 72 as well as the servo-actuator 61 under program control.

Figure 4:
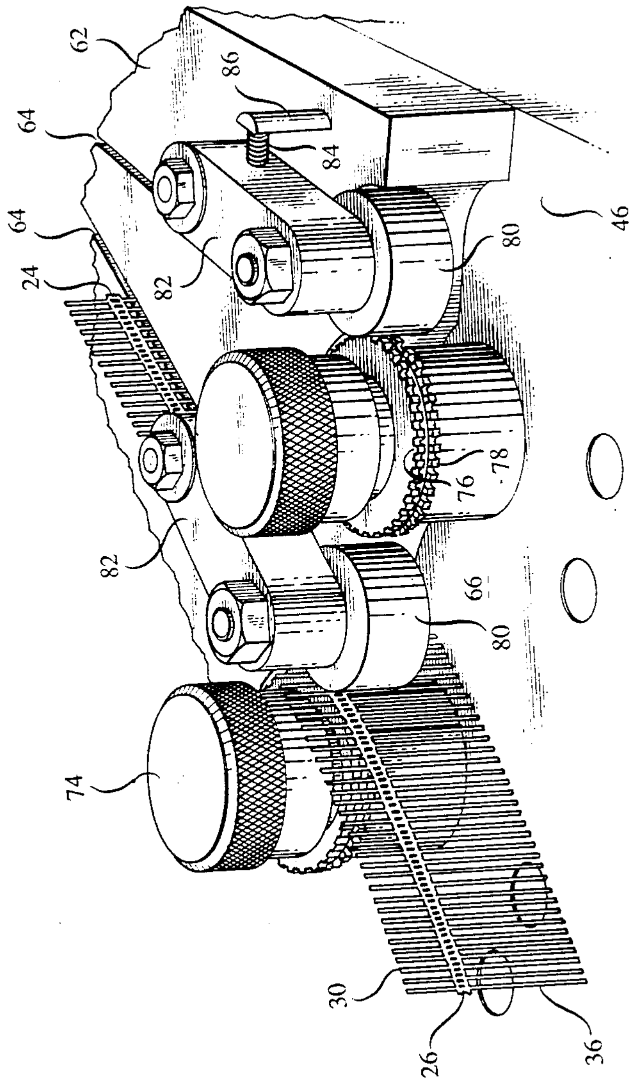
FIG. 4 is a perspective view of a feed roller on the apparatus of FIG. 3.

Referring now to FIG. 4, each feed roller 66 has a knurled knob 74 attached to the upper end thereof to enable the feed roller to be manually rotated if necessary. Each feed roller 66 also has two sets of teeth 76 and 78 protruding radially from the periphery thereof so as to be spaced one above the other below the knob 74. The spacing between the sets of teeth 76 and 78 is slightly greater than the distance between the top and bottom of the spine 26 of the pin strip 24. In practice, the lower set of teeth 78 on each feed roller 66 is spaced above the surface of the plate 46 a distance on the order of the length of the pin members 36 of the pin strip 28. The size and pitch of the teeth within the sets 76 and 78 is such that when the spine 26 of the pin strip 24 is pressed between the sets of teeth, the pin members 30 and 36 will mesh therewith.

Associated with each feed roller 66 is a tension roller 80, which is journaled to one end of an arm 82 for rotation about an axis parallel to that of the feed roller. Each arm 82 has its other end rotatably mounted to a separate one of the channel members 62 so as to be separated from the associated one of the feed rollers 66 by one of the channels 64. The height of each arm 82 and the thickness of each tension roller 80 are selected such that the top and bottom of the tension roller lie above and below, respectively, the teeth sets 76 and 78, respectively, on the associated feed roller 66.

Each tension roller 80 is biased towards the associated feed roller 66 by a spring 84 interposed between the arm 82 carrying the tension roller and a post 86 extending upwardly from the corresponding channel member 62. Thus, each tension roller 80 urges the pin strip 24, fed into each channel 62, into contact with the corresponding feed roller 66 so the sets of teeth 76 and 78 thereon mesh with the pin members 30 and 36, respectively. When each feed roller 66 is rotatably driven in a clockwise and counterclockwise direction, the pin strip 24 fed into each channel 64 will be displaced towards or away from the input slot 40 of FIG. 3.

Referring to FIG. 3, the pin strip 24 fed into each channel 64 is usually supplied in a large roll 88 (only one shown). In practice, each roll 88 is rotatably supported by means (not shown) so that the pin strip 24, when unwound from the roll, will be oriented such that its major plane is horizontal. In order to feed the pin strip 24 unwound from each roll 88 into each channel 64, the pin strip must be twisted 90° so that the major plane thereof is in a vertical orientation. However, it is desirable that the twisting of each pin strip 24 occur as far away as possible from the roll 88 to avoid difficulties in unwinding the pin strip therefrom. To this end, each of a plurality of guide assemblies 90 is secured to the plate 46 adjacent the rearward edge 48 thereof for guiding the pin strip 24 unwound from the roll 88 to insure that the pin strip does not twist until passage thereof over the plate.

Figure 5:
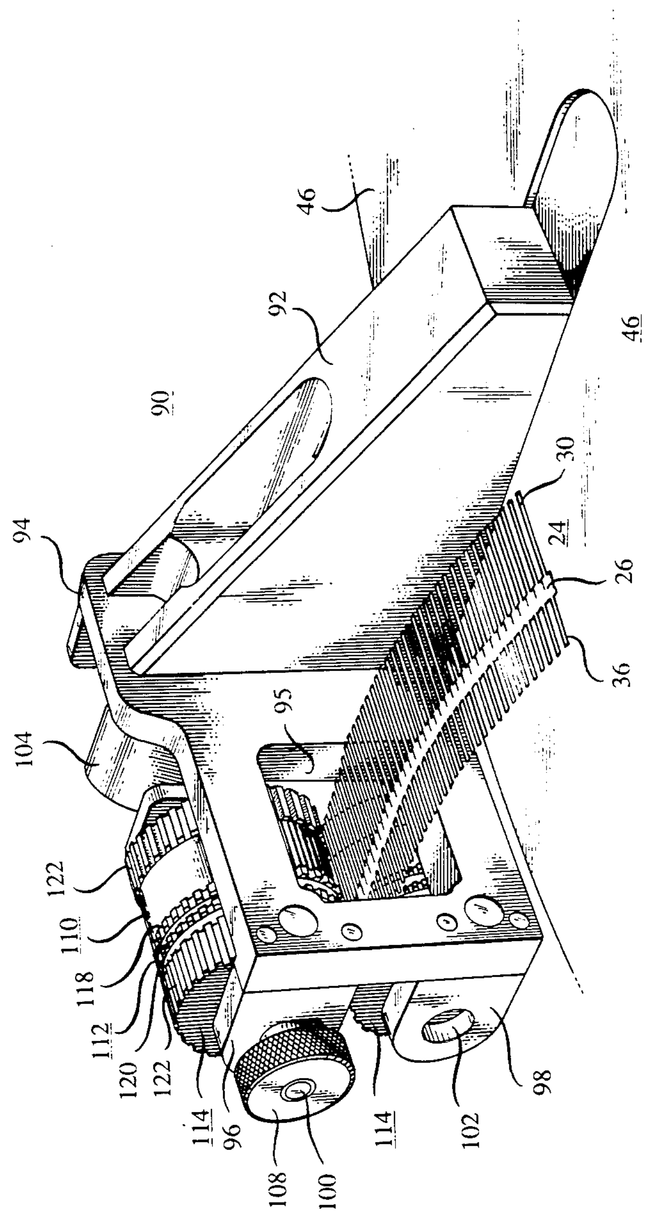
FIGS. 5, 6 and 7 are perspective front, back and side views, respectively, of a guide assembly on the apparatus of FIG. 3.

The guide assemblies 90 are identical in construction and, therefore, only the details of one such assembly will be described with reference to FIGS. 5, 6 and 7 which illustrate, in perspective, a front, back and side view thereof. Each guide assembly 90 comprises a first vertical wall 92, secured to the plate 46 so as to rise upwardly therefrom, and a second vertical wall 94 attached to the first one at a right angle therewith. As best seen in FIG. 5, the wall 94 has a window 95 therethrough which is slightly wider than the height of the pin strip 24. In this way, the pin strip 24 can pass through the window 95 when the pin strip is oriented so that the major plane thereof is horizontal.

Figure 6:
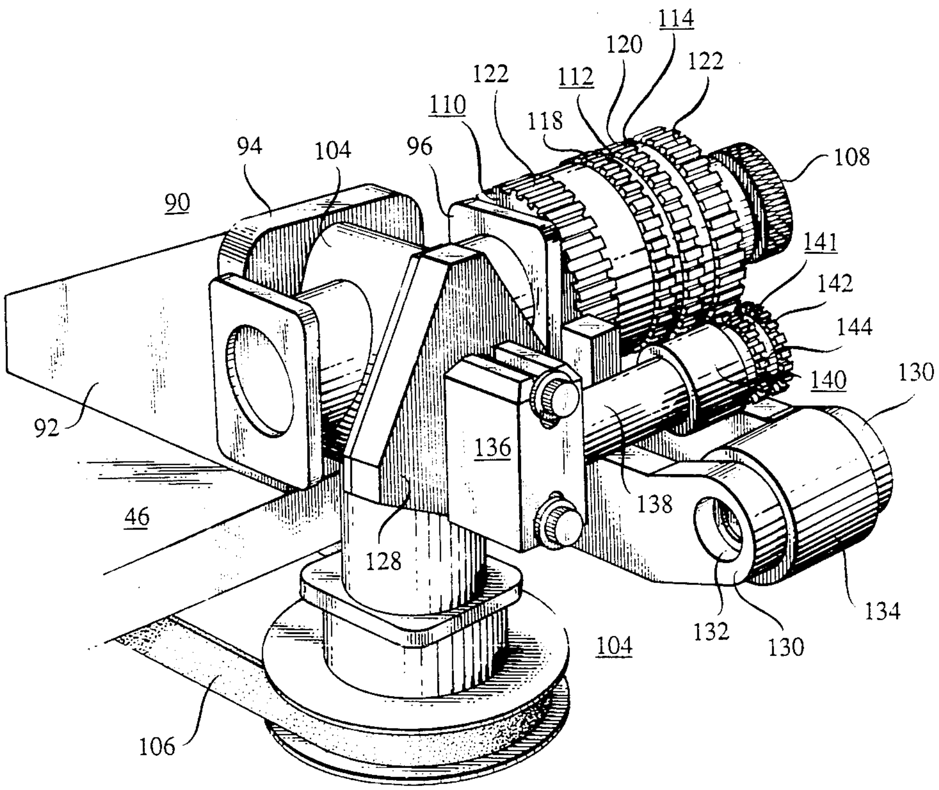
Figure 7:
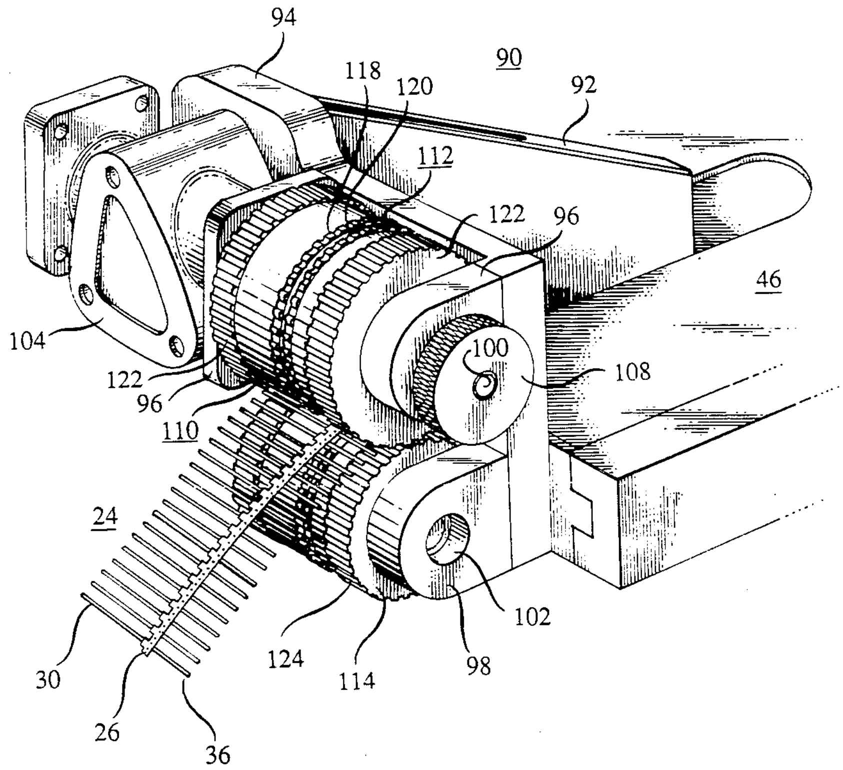

Referring to FIG. 7, the wall 94 mounts a first and second pair of vertically spaced gudgeons 96 and 98, the gudgeons of each pair being located on opposite sides of the window 95 (see FIG. 5). The first and second pair of gudgeons 96 and 98 each serve to rotatably journal opposite ends of a separate one of shafts 100 and 102, respectively. The shaft 100 has a first end (not shown) coupled to a right angle drive mechanism 104, which, as best illustrated in FIGS. 6 and 7, is affixed to the wall 94. The right angle drive mechanism 104 is driven via a belt 106 from a separate one of the feed rollers 66 (see FIG. 3). Referring to FIGS. 5 and 7, the other end of the shaft 100 has a knurled knob 108 attached thereto which enables the shaft to be manually rotated if necessary.

Each of the shafts 100 and 102 carries three rollers 110, 112, and 114 which are electrically insulated from the other rollers carried on the same shaft. In practice, the rollers 110, 112 and 114 are of equal diameter and are sized such that a small gap, slightly greater than the thickness of the pin strip 24, exists between the periphery of the rollers on the shaft 100 and those on the shaft 102. Each roller 112 has two sets of spaced teeth 118 and 120 extending radially from the periphery thereof a distance on the order of one-half the thickness of the pin strip 24. The spacing between the teeth 118 and 120 on the roller 112 is slightly greater than the distance between the top and bottom of the spine 26 of the pin strip 24. The pitch of the teeth 118 and 120 is such that the pin members 30 and 36 of the pin strip 24 will mesh therewith when the pin strip 24 is fed between the rollers 110, 112 and 114 on the shafts 100 and 102. The meshing engagement of the teeth 118 and 120 on each roller 112 with the pin members 30 and 36, respectively, of the pin strip 24 enables the pin strip to be moved in through the window 95 when the shaft 100 is rotatably driven.

The rollers 110 and 114 each have a set of teeth 122 thereon extending radially from the periphery thereof a distance on the order of one-half the thickness of the pin strip 24. In practice, the teeth 122 on each roller 110 are laterally spaced from the teeth 122 on each roller 114 by a distance slightly less than the height of the pin strip 24. The size and pitch of the teeth 122 on each of the rollers 110 and 114 is such that the teeth will fit between, but not mesh or make contact with, the pin members 30 and 36 respectively, of the pin strip 24 fed between the rollers carried by the shafts 100 and 102 so long as the pin members are not bent. Those of the pin members 30 and 36 on the pin strip 24 which are bent or misaligned will contact one or more of the teeth 122 on one of the rollers 110 and 114.

Referring to FIG. 6, a frame 128 is mounted to the right angle drive mechanism 104. (For purposes of clarity, the frame 128 has been omitted from FIG. 7.) The frame 128 mounts a pair of arms 130 which are aligned with a separate one of the pair of gudgeons 98 of FIG. 7. The arms 130 each serve to rotatably journal the opposite ends of the shaft 132 which rotates about an axis parallel to the axis of the shafts 100 and 102 of FIG. 7. The shaft 132 carries a roller 134 thereon over which the pin strip 24 (see FIGS. 5 and 7) rides before passing between the rollers 110, 112, and 114 on the shafts 100 and 102 of FIG. 7.

The frame 128 also mounts a bracket 136 which has one end of a shaft 138 rotatably journaled thereto so as to extend therefrom parallel to, but at a height above, the roller 134. A concentric collar 140 is rotatably carried by the shaft 138 so as to be aligned with the teeth sets 118 and 120 on the roller 112. A gear 141, having two sets of teeth 142 and 144 thereon, is rotatably journaled to the end of the shaft 138 so both sets of teeth on the gear are in registration with the teeth 122 on each roller 114. The teeth 142 and 144 on the gear 141 each have a pitch which enables the teeth to mesh with the pin members 36 (see FIGS. 2, 3, 4, 5, and 7) of the pin strip 24 passing over the roller 134. In practice, the bracket 136 is adjusted so that the collar 140 presses against the pin strip 24 fed between the collar and the roller 134 to keep the pin strip flat and straight upon the passage thereof between the rollers 110, 112 and 114 carried by the shafts 100 and 102 of FIG, 7.

Figure 8:
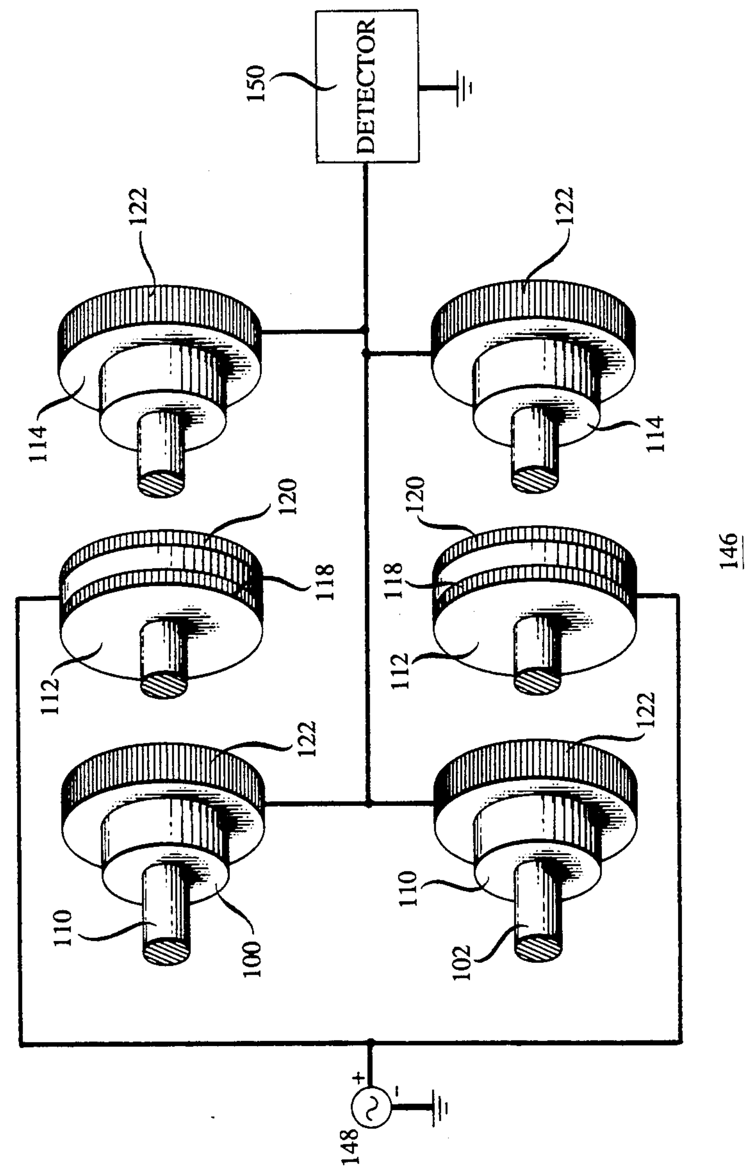
FIG. 8 is a schematic diagram of an electrical circuit coupled to the guide assembly of FIGS. 5, 6 and 7 for sensing whether the continuous pin strip fed into the apparatus of FIG. 3 is bent.

Referring now to FIG. 8, there is shown a schematic block diagram of a circuit 146 associated with each guide assembly 90 of FIGS. 5, 6 and 7, for detecting if any of the pin members 30 or 36 (see FIGS. 2, 5 and 7) of the pin strip 24 guided thereby are bent. The circuit includes a signal source 148, typically a low voltage dc supply, having its negative (−) terminal coupled to circuit ground. The positive (+) terminal of the signal source 148 is coupled via a slip-ring arrangement (not shown) to the rollers 112 carried by each of the shafts 100 and 102. A signal detector 150 has one of a pair of inputs thereto coupled to circuit ground while the other input is coupled via a slip-ring arrangement (not shown) to the rollers 110 and 114 carried by each of the shafts 100 and 102.

As indicated previously, the rollers 110, 112, and 114 on each of the shafts 100 and 102 are electrically insulated from each other. In the absence of an electrical connection between either of the rollers 112 on the shafts 100 and 102 and any one of the rollers 110 and 114, the detector 150 will not register the receipt of a signal from the signal source 148. When the pin strip 24 (see FIGS. 2–5 and 7) is fed between the rollers 110, 112 and 114 on the shafts 100 and 102, the pin strip will make an electrical contact with one or both of the rollers 112. However, if none of the pin members 30 or 36 (see FIGS. 2 and 5) on the pin strip 24 is bent or misaligned, then there will be no contact between the pin strip and any of the rollers 110 and 114.

If, however, any of the pin members 30 and 36 of the pin strip 24 are indeed bent, then the bent pin member will contact one of the rollers 110 and 114, respectively. As a result, an electrical connection will be made between one of the rollers 112 and one of the rollers 110 and 114, causing the detector 150 to register the receipt of a signal from the signal source 148. By monitoring whether the detector 150 has received a signal from the signal source, an indication can be had if any of the pin members 30 and 36 of the pin strip 24 are bent or misaligned, which would give rise to a bent pin 14 (see FIGS. 1 and 2).

It is to be understood that the embodiments described herein are merely illustrative of the principles of the invention. Various modifications and changes may be made thereto by persons skilled in the art which will embody the principles of the invention and fall within the spirit and scope thereof.

What is claimed is:

1. A method for fabricating an article comprising the steps of:

selectively feeding a first one of a plurality of strips of material into an input slot on a machine which processes the strips to at least partially fabricate said article; and completing the fabrication of said article, characterized in that said step of selectively feeding said first one of said strips comprises the steps of:

guiding each of said strips into one end of a separate one of a plurality of channels extending across a plate;

indexing the plate to selectively align the other end of a first one of said channels containing a first strip with the input slot; and advancing said first strip within said first channel so said first strip passes through said channel and into said input slot for processing by the machine while controlling the length of the strip advanced through the channel to permit varying lengths to be advanced.

2. The method according to claim 1, characterized in that a second one of said plurality of strips of material is selectively fed into the input slot by the steps of:

(a) withdrawing said first strip from the input slot;

(b) indexing said plate so that the end of a second one of said channels, containing said second strip, is aligned with the input slot; and (c) advancing said second strip within said second channel into the input slot.

3. The method according to claim 1, characterized in that each strip being guided into each channel has its major plane in a vertical orientation.

4. The method according to claim 2, characterized in that each strip is first unwound from a roll so that the major plane of said strip is in a horizontal orientation and then each strip is twisted 90° so that the major plane thereof is in vertical orientation prior to being guided into each channel.

5. A method for fabricating an article comprising the steps of:

selectively feeding a first one of a plurality of pin strips into an input slot on a machine which processes the pin strips to at least partially fabricate said article; and completing the fabrication of said article, characterized in that said step of selectively feeding said first one of said pin strips comprises the steps of:

guiding each of said plurality of pin strips into one end of a separate one of a plurality of channels extending across a plate;

indexing the plate to selectively align the other end of a first one of said channels containing said first pin strip with the input slot; and advancing said first strip within said first channel so said first strip passes through said channel and into said input slot for processing by the machine while controlling the length of the strip advanced through the channel to permit varying lengths to be advanced.

6. The method according to claim 5, characterized in that a second one of said pin strips is selectively fed into the input slot by the steps of:

(a) withdrawing said first pin strip from the input slot;

(b) indexing the plate so that the end of a second one of said channels containing said second pin strip is aligned with the input slot; and (c) advancing said second pin strip within said second channel to feed said pin strip into said input slot.

7. The method according to claim 6, characterized in that each said pin strip being guided into each channel has its major plane in a vertical orientation.

8. The method according to claim 7, characterized in that each pin strip is first unwound from a roll so that the major plane of the strip is horizontally oriented and then each strip is twisted 90° so that the major plane thereof is vertically oriented prior to being guided into each channel.

9. The method according to claim 5, characterized in that the condition of each of said pin strips fed is monitored prior to being fed into each of said channels to check for bending.

10. Apparatus for selectively feeding one of a plurality of strips into an input slot on a machine for processing by the machine, characterized in that said apparatus comprises:

a plate having a plurality of stationary, spaced channels extending thereacross;

means for guiding each of said plurality of strips into an end of each of said channels;

means for indexing said plate to align the other end of a first one of said channels containing the first one of said strips with an input slot on said machine; and means for displacing varying lengths of said first strip of material to advance said first strip into said input slot on said machine for processing thereby and to retract said first strip away from said input slot once said machine has completed processing of said first strip.

11. The invention according to claim 10, characterized in that said channels within said plate fan outwardly as they run away from the input slot.

12. The invention according to claim 10, characterized in that said means for guiding each of said strips comprises:

a frame having a window therethrough sized to receive said strip; and a pair of roller assemblies each rotatably journaled to said frame on opposite sides of said window for engaging said strip.

13. The invention according to claim 10, characterized in that said means for advancing said strip within each channel comprises:

a rotatable feed roller situated adjacent to the end of each channel distant from the input slot of the machine for engaging with said strip guided within said channel; and a tension roller spring biased against said feed roller to maintain said strip in engagement therewith.

14. The apparatus according to claim 10, characterized in that said apparatus further includes means for sensing whether each of said strips of material being guided into each of said channels is bent.

* * * * *